(12) United States Patent
Huang et al.

(10) Patent No.: US 9,500,820 B2
(45) Date of Patent: Nov. 22, 2016

(54) FIBER ASSEMBLY

(71) Applicant: FOXCONN INTERCONNECT TECHNOLOGY LIMITED, Grand Cayman (KY)

(72) Inventors: Shuai-Hui Huang, Kunshan (CN); Ru-Yang Guo, Kunshan (CN); Hai-Li Wang, Kunshan (CN); Qing-Man Zhu, Kunshan (CN); Li-Shing Hou, New Taipei (TW); Jerry Wu, Irvine, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/887,356

(22) Filed: Oct. 20, 2015

(65) Prior Publication Data

US 2016/0109666 A1   Apr. 21, 2016

(30) Foreign Application Priority Data

Oct. 20, 2014 (CN) .................... 2014 2 0604575 U

(51) Int. Cl.
*G02B 6/42* (2006.01)

(52) U.S. Cl.
CPC ............. *G02B 6/4212* (2013.01); *G02B 6/423* (2013.01); *G02B 6/424* (2013.01)

(58) Field of Classification Search
CPC .................. G02B 6/4212; G02B 6/423; G02B 6/424
USPC ................. 385/14, 32, 39, 49, 52, 88, 89, 92
See application file for complete search history.

(56) References Cited

U.S. PATENT DOCUMENTS

| | | | |
|---|---|---|---|
| 5,495,541 A | 2/1996 | Murray et al. | |
| 6,116,791 A * | 9/2000 | Laninga | G02B 6/3829 385/83 |
| 6,910,812 B2 * | 6/2005 | Pommer | G02B 6/4201 257/200 |
| 7,805,035 B2 | 9/2010 | Kato et al. | |
| 8,485,738 B2 * | 7/2013 | Rosenberg | G02B 6/3829 385/71 |
| 2005/0180700 A1 * | 8/2005 | Farr | G02B 6/4246 385/89 |
| 2008/0025674 A1 * | 1/2008 | Sasaki | G02B 6/423 385/88 |
| 2009/0052836 A1 * | 2/2009 | Hodge | G02B 6/43 385/14 |

(Continued)

*Primary Examiner* — Ryan Lepisto
(74) *Attorney, Agent, or Firm* — Wei Te Chung; Ming Chieh Chang

(57) ABSTRACT

A fiber assembly (100) includes a printed circuit board (1), an optoelectronic element (2) defined on the printed circuit board and having a top surface (21), a transmission media (3) optical coupling with the optoelectronic element, and an optical cement (4) used for fixing the transmission media to the optoelectronic element. A tip end of the transmission media needs not with polishing processing, and the tip end of the transmission media is directly facing to the top surface of the optoelectronic element in order to realization of optical coupling, the optical cement is enclosing on the optoelectronic element and the tip end of the transmission media, the optical cement is filling a space between the transmission media and the optoelectronic element, the refractive index of the optical cement is close unlimitedly to the refractive index of the transmission media.

4 Claims, 6 Drawing Sheets

(56) References Cited

U.S. PATENT DOCUMENTS

2014/0016898 A1 1/2014 Lee et al.

* cited by examiner

FIBER ASSEMBLY

FIELD OF THE INVENTION

The present invention generally relates to a fiber assembly, and more particularly to a fiber assembly with an improved optical transmission system.

DESCRIPTION OF PRIOR ART

Optical signal transmitting is widely adopted for internet or intranet communication. A fiber assembly is an important physical link for connecting two devices so as to establish the optical signal transmitting path therebetween.

In optics, an index-matching material is a substance, usually a liquid, cement (adhesive), or gel, which has an index of refraction that closely approximates that of another object (such as a lens, material, fiber-optic, etc.). In fiber optics and telecommunications, an index-matching material may be used in conjunction with pairs of mated connectors or with mechanical splices to reduce signal reflected in the guided mode. Without the use of an index-matching material, Fresnel reflections will occur at the smooth end faces of a fiber unless there is no fiber-air interface or other significant mismatch in refractive index. When the reflected signal returns to the transmitting end, it may be reflected again and return to the receiving end at a level that is (28 plus twice the fiber loss) dB below the direct signal. The reflected signal will also be delayed by twice the delay time introduced by the fiber. The twice-reflected, delayed signal superimposed on the direct signal may noticeably degrade an analog baseband intensity-modulated video signal. Conversely, for digital transmission, the reflected signal will often have no practical effect on the detected signal seen at the decision point of the digital optical receiver except in marginal cases where bit-error ratio is significant. For some applications, instead of standard polished connectors (e.g. FC/PC), angle polished connectors (e.g. FC/APC) may be used, whereby the non-perpendicular polish angle greatly reduces the ratio of reflected signal launched into the guided mode even in the case of a fiber-air interface.

Hence, an improved fiber assembly is highly desired to overcome the aforementioned problems.

SUMMARY OF THE INVENTION

Accordingly, an object of the present invention is to provide a fiber assembly having a simple structure for optical signal transmission.

In order to achieve the object set forth, a fiber assembly in accordance with the present invention comprises a printed circuit board, an optoelectronic element defined on the printed circuit board and having a top surface, a transmission media optical coupling with the optoelectronic element, and an optical cement used for fixing the transmission media to the optoelectronic element. A tip end of the transmission media needs not with polishing processing, and the tip end of the transmission media is directly facing to the top surface of the optoelectronic element in order to realization of optical coupling, the optical cement is enclosing on the optoelectronic element and the tip end of the transmission media, the optical cement is filling a space between the transmission media and the optoelectronic element, the refractive index of the optical cement is close unlimitedly to the refractive index of the transmission media.

Other objects, advantages and novel features of the invention will become more apparent from the following detailed description when taken in conjunction with the accompanying drawings.

DETAILED DESCRIPTION OF PREFERRED EMBODIMENTS

Figure 1:
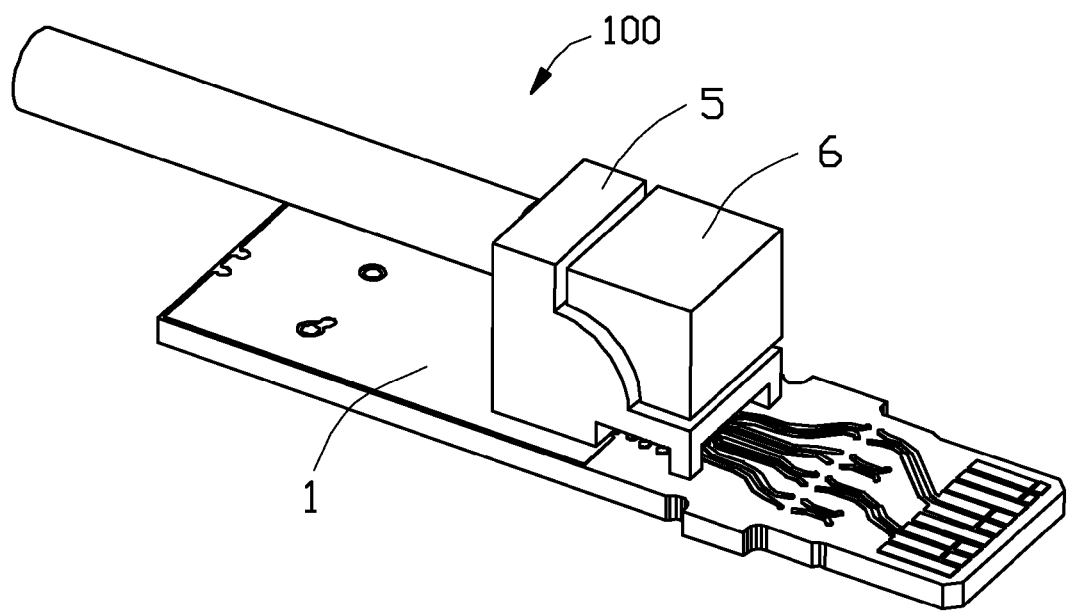
FIG. 1 is an assembled, perspective view of a fiber assembly in accordance with the present invention.
Figure 2:
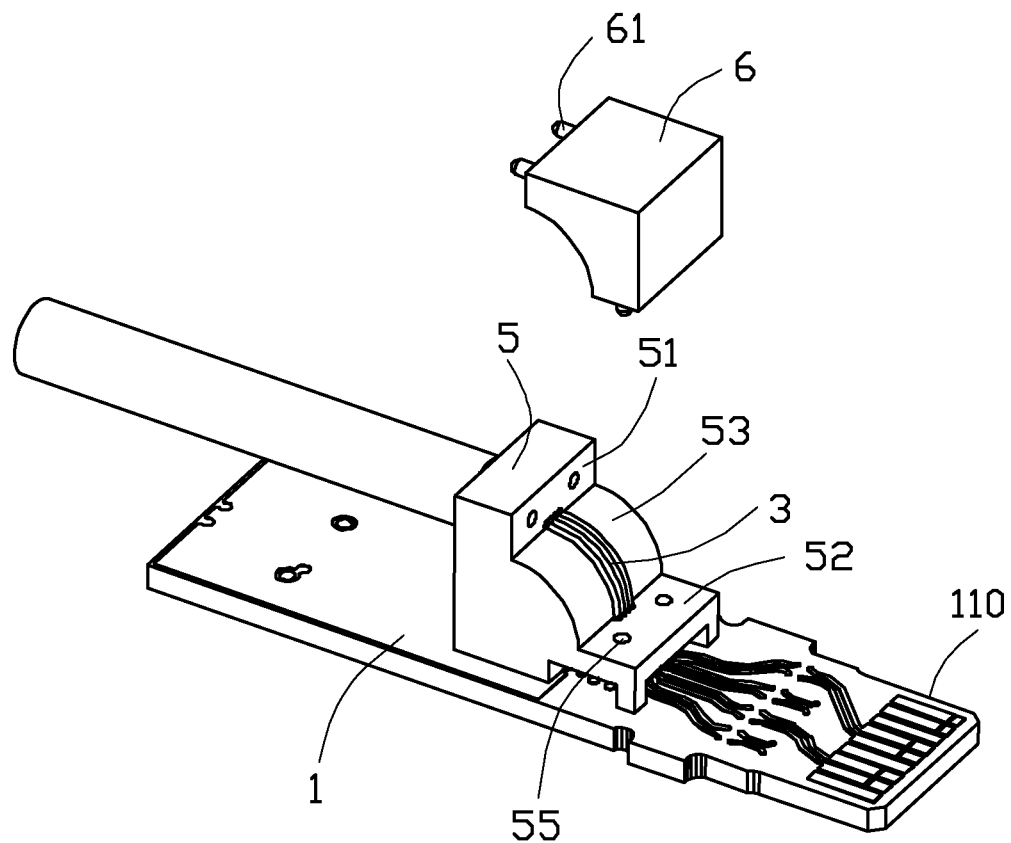
FIG. 2 is a partially exploded view of the fiber assembly shown in FIG. 1.
Figure 3:
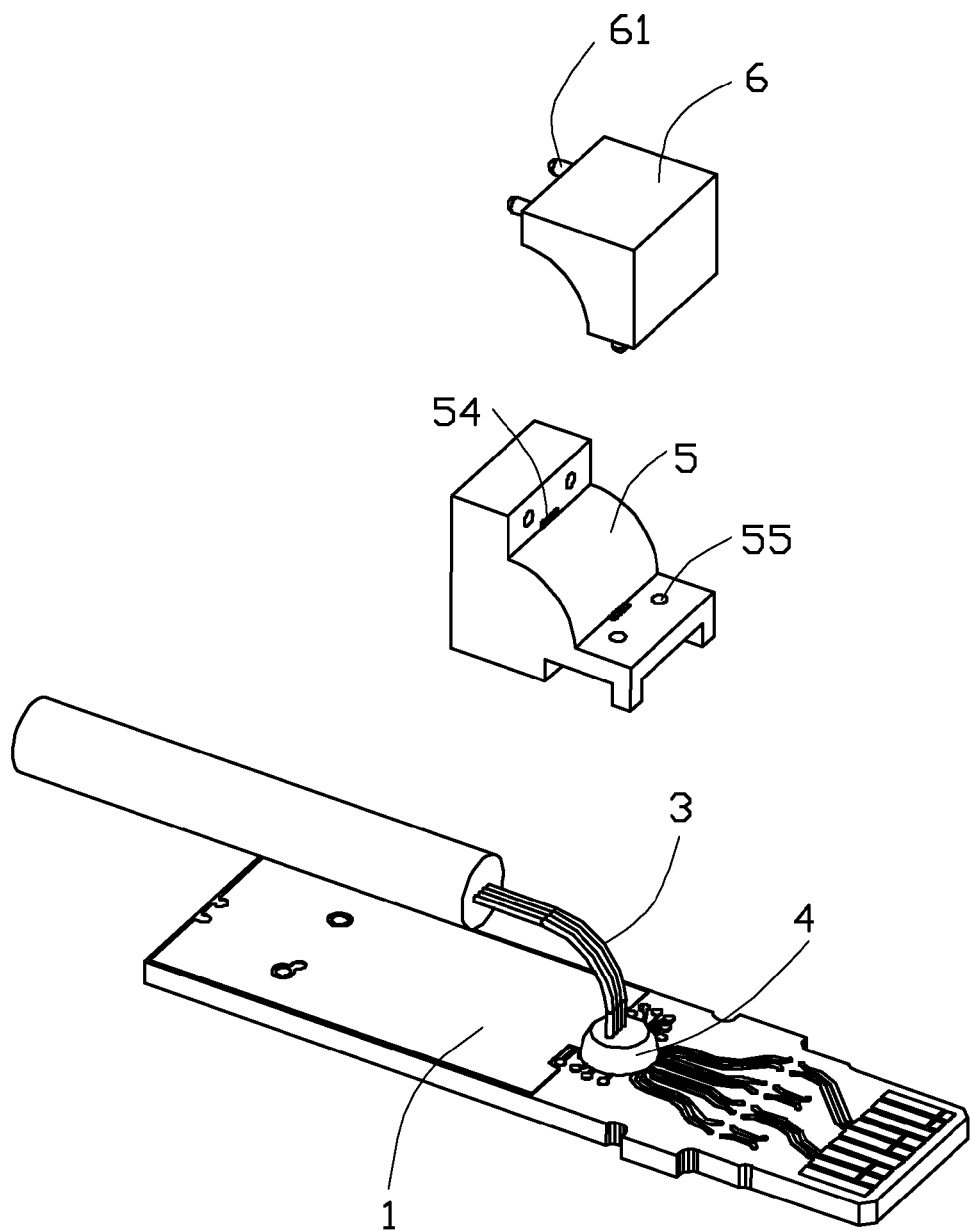
FIG. 3 is another partially exploded view of the fiber assembly shown in FIG. 1.
Figure 4:
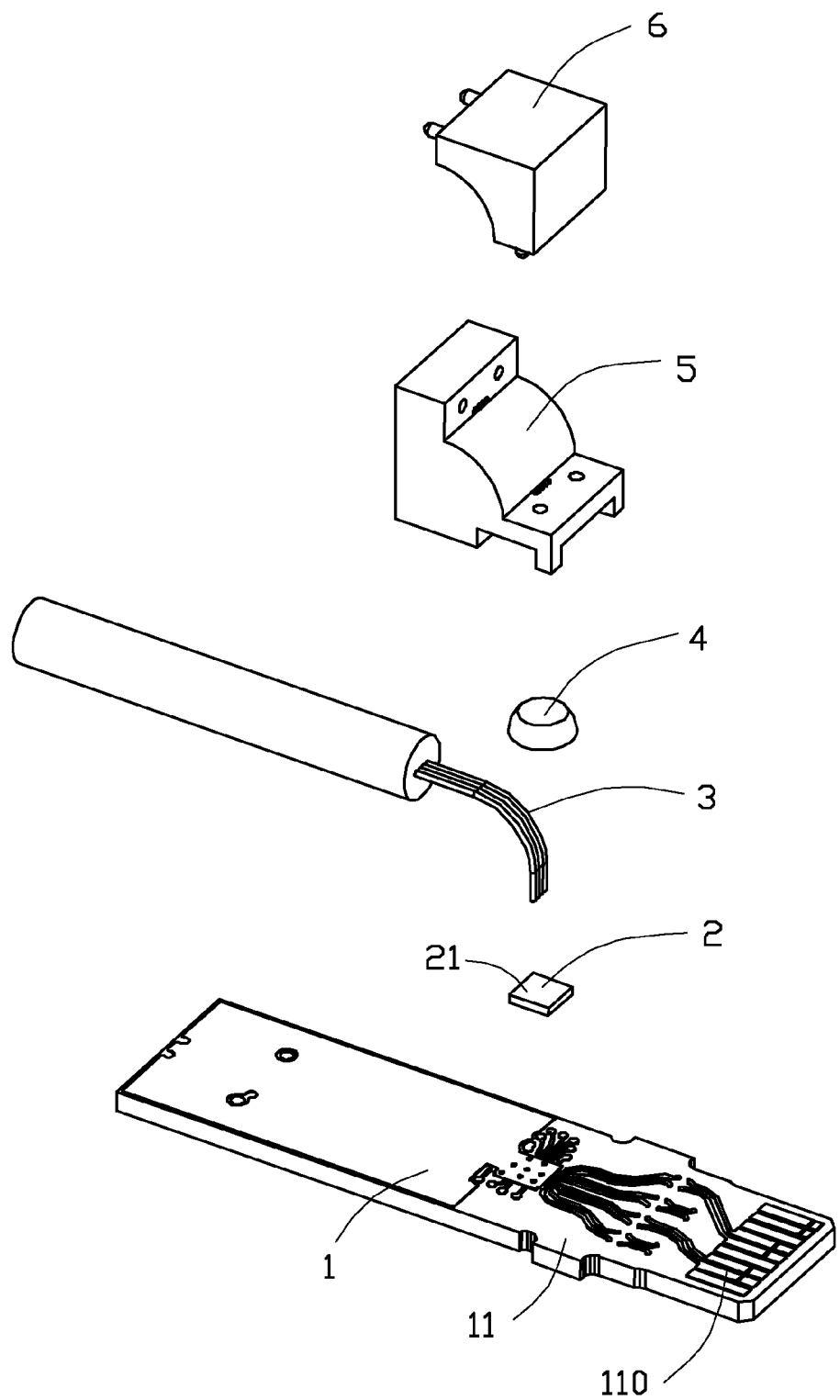
FIG. 4 is an exploded view of the fiber assembly shown in FIG. 1.

Reference will now be made in detail to the preferred embodiment of the present invention.

Referring to FIGS. 1-4, a fiber assembly 1000 in accordance with the present invention comprises a printed circuit board 1, an optoelectronic element 2 defined on the printed circuit board 1, a transmission media 3 optical coupling with the optoelectronic element 2, an optical cement 4 fastening the transmission media 3 with the optoelectronic element 2, a housing 5 fixing the transmission media 3, and a cover 6 cooperating with the housing 5.

The printed circuit board 1 comprises a first surface 11 and a second surface 12 opposite to each other, and a plurality of conductive pads 110, 120 are defined on the first surface 11 and the second surface 12 respectively.

The optoelectronic element 2 is used for photoelectric conversion and transmission between the transmission media 3 and the printed circuit board 1, and the optoelectronic element 2 can be a vertical laser transmitter, and also can be a photodetector. The optoelectronic element 2 has a top surface 21.

Figure 5:
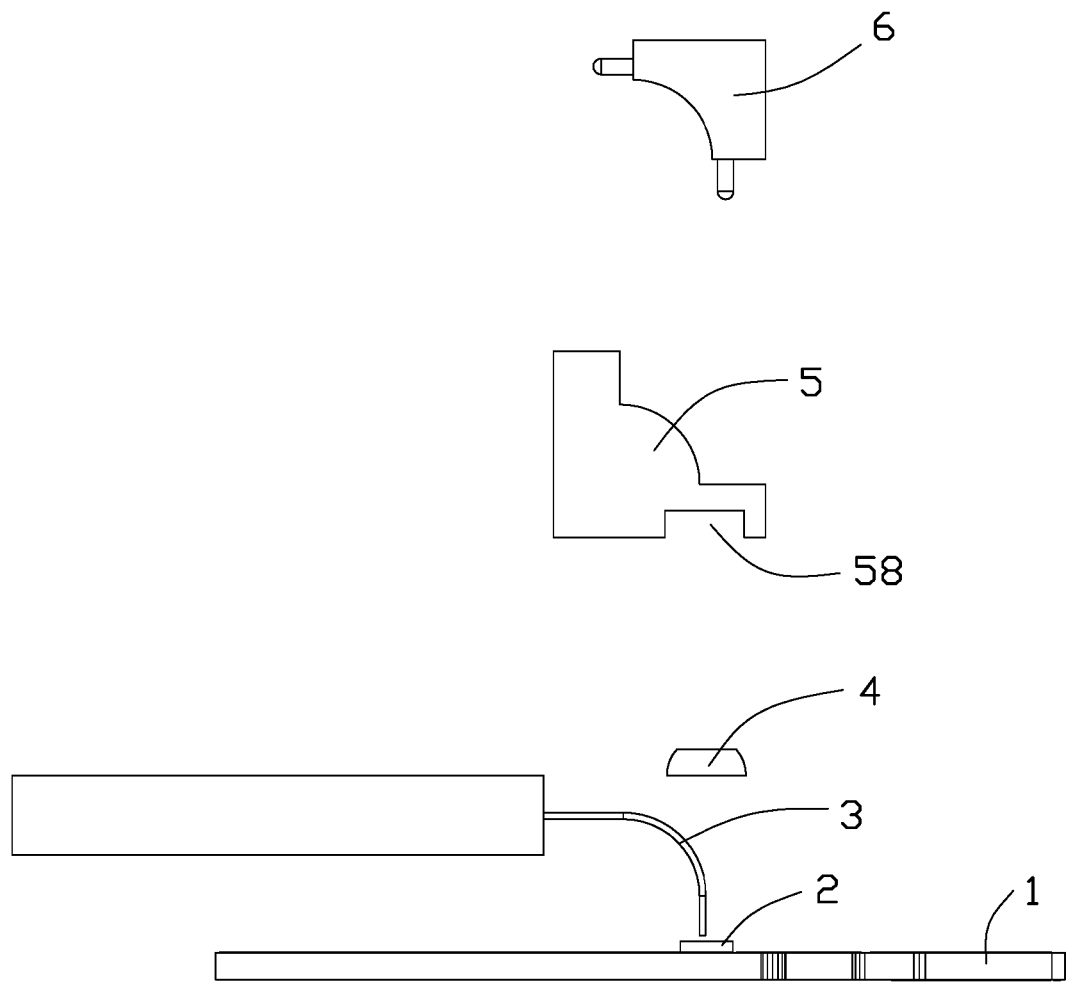
FIG. 5 is a front elevation view of the fiber assembly shown in FIG. 4.
Figure 6:
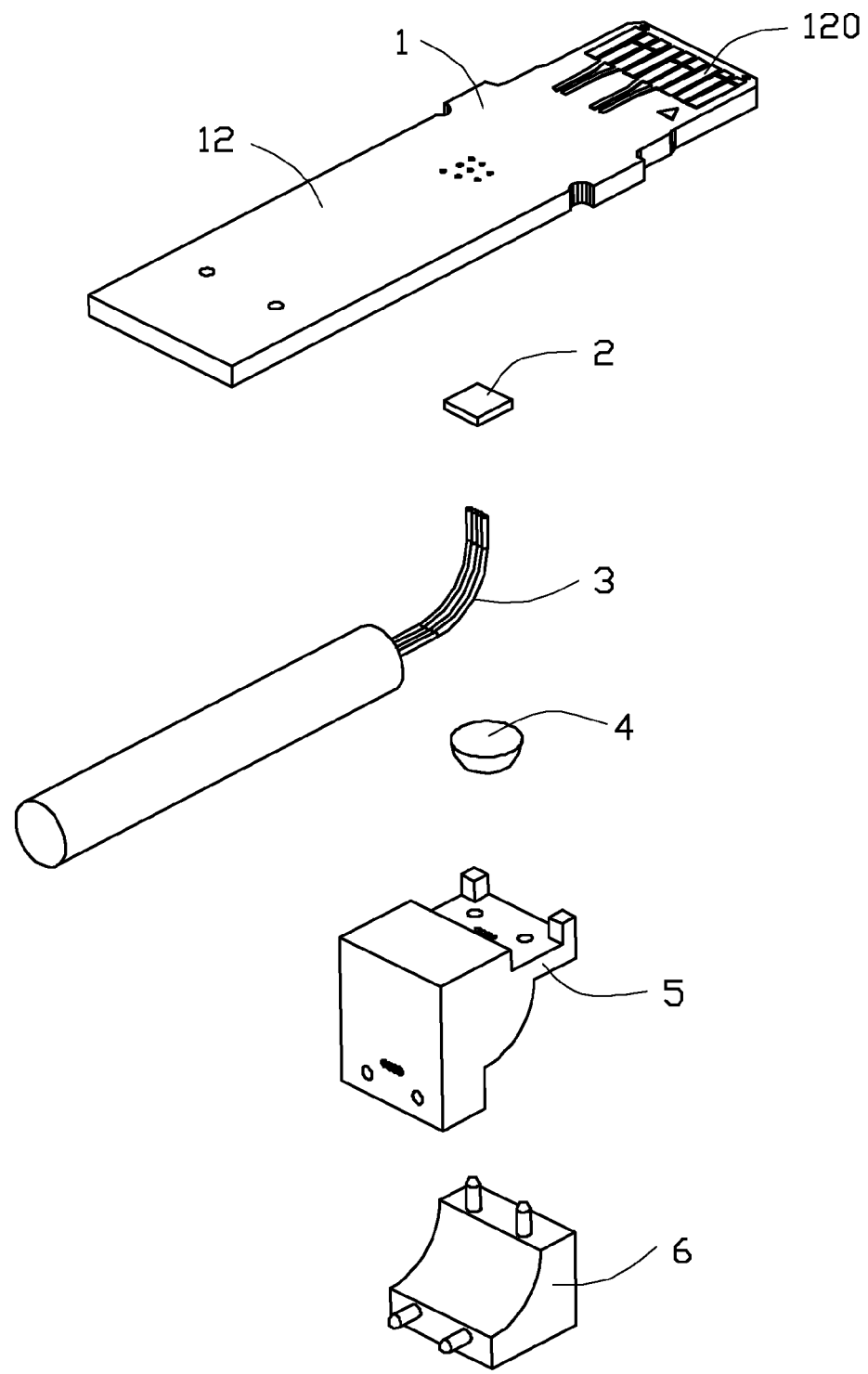
FIG. 6 is similar to FIG. 4, but viewed from other aspect.

Referring to FIGS. 5-6, in the present embodiment, the transmission media 3 is a plurality of fiber, and in other embodiment, the transmission media 3 also can be other types of media. Tip end of the transmission media 3 needs not with polishing processing, and the tip end of the transmission media 3 is directly facing to the top surface 21 of the optoelectronic element 2 in order to realization of optical coupling. Main section of the transmission media 3 is parallel to the top surface 21 of the optoelectronic element 2, the transmission media 3 is bent to form a quadrant and then facing to the top surface of the optoelectronic element 2, and only facing to the optoelectronic element 2, but not contacting with optoelectronic element 2.

The optical cement 4 is used for fixing the transmission media 3 to the optoelectronic element 2, and enclosing on the optoelectronic element 2 and the tip end of the transmission media 3. The optical cement 4 is filling a space between the transmission media 3 and the optoelectronic element 2, the refractive index of the optical cement 4 is close unlimitedly to the refractive index of the transmission media 3.

The unitary housing 5 includes a vertical wall 51, a horizontal wall 52 and an intermediate wall 53 connecting with the vertical wall 51 and the horizontal wall 52, and the intermediate wall 53 has an arc shaped convex surface according with a bending radian of the transmission media 3. The intermediate wall 53 has a quarter of cylindrical structure. Each of the vertical wall 51 and the horizontal wall 52 defines a through hole 54 for the transmission media 3 extending through. The transmission media 3 is inserted into the through hole 54 of the vertical wall 51, then extending and abutting against the intermediate wall 53, and finally extending through the through hole 54 of the horizontal wall 52 for facing to the top surface 21 of the optoelectronic element 2. A plurality of mounting holes 55 are defined on the vertical wall 51 and the horizontal wall 52 respectively, and the housing 5 is settled on the printed circuit board 1 via glue. The housing 5 forms a receiving cavity 58 in an underside to protectively receive therein the optical cement 4 which fully circumferentially encloses the electronic element 2 and the tip of the transmission media 3.

The cover 6 is mounted to the housing 5 along the up-to-down direction, for holding and fixing the transmission media 3. The cover 6 is equipped with a plurality of discrete positioning posts 61, and the positioning posts 61 are inserted into the mounting holes 55, therefore to keep the housing 5 and the cover 6 together.

In assembly, the optoelectronic element 2 is mounted on the printed circuit board 1, the transmission media 3 is extending through the housing 1 and facing to the top surface 21 of the optoelectronic element 2. The optical cement 4 in a bowl form is fixing the optoelectronic element 2 and the transmission media 3, and the housing 5 is arranged on the printed circuit board 1 via glue, then the positioning posts 61 are inserted into the corresponding mounting holes 55, thus the transmission media 3 is held by the cover 6 associated with the housing 5.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optoelectronic assembly comprising:
   a printed circuit board extending in a horizontal plane;
   an optoelectronic device mounted upon the printed circuit board in a vertical direction perpendicular to said horizontal plane;
   an optical fiber extending at least along a front-to-back direction perpendicular to said vertical direction;
   a unitary housing mounted upon the printed circuit board and independently forming at least one through hole in the vertical direction;
   a front end portion of the optical fiber extending curvedly downwardly with a tip downwardly extending snugly through the through hole and intimately confronting the optoelectronic device in the vertical direction without a lens therebetween; wherein
   the housing forms a receiving cavity in which the electronic device is received, and said at least one through hole downwardly communicates with the receiving cavity; wherein
   an optical cement is protectively received within the receiving cavity to fully circumferentially enclose the electronic device and the tip.

2. The optoelectronic assembly as claimed in claim 1, wherein said housing forms a curved surface along which said front end portion extends.

3. The optoelectronic assembly as claimed in claim 2, further including a cover cooperating with the housing to sandwich said optical fiber therebetween.

4. The optoelectronic assembly as claimed in claim 1, wherein said optical cement defines a bowl form.

* * * * *